United States Patent
Schmed

(10) Patent No.: US 6,536,332 B2
(45) Date of Patent: Mar. 25, 2003

(54) COFFEE MACHINE FOR BREWING COFFEE POWDER PRE-PACKED IN A CARTRIDGE

(75) Inventor: Arthur Schmed, Oberdürnten (CH)

(73) Assignee: Fianara International B.V., Amsterdam (NL)

( * ) Notice: Subject to any disclaimer, the term of this patent is extended or adjusted under 35 U.S.C. 154(b) by 0 days.

(21) Appl. No.: 09/940,021

(22) Filed: Aug. 27, 2001

(65) Prior Publication Data

US 2002/0023543 A1 Feb. 28, 2002

(30) Foreign Application Priority Data

Aug. 30, 2000 (CH) .............................. 1690/00

(51) Int. Cl.$^7$ .............................................. A47J 31/00
(52) U.S. Cl. ........................ 99/295; 99/302 R; 99/300
(58) Field of Search .............. 99/295, 302 R, 99/300, 307, 283

(56) References Cited

U.S. PATENT DOCUMENTS

| | | | |
|---|---|---|---|
| 4,846,052 A | * 7/1989 | Favre et al. ............... | 99/295 |
| 5,197,374 A | * 3/1993 | Fond ......................... | 99/295 |
| 5,472,719 A | 12/1995 | Favre ........................ | 99/295 |
| 6,026,732 A | 2/2000 | Kollep et al. ............. | 99/295 |
| 6,079,315 A | 6/2000 | Beaulieu et al. .......... | 99/295 |

FOREIGN PATENT DOCUMENTS

| | | |
|---|---|---|
| CH | 688 686 A5 | 1/1998 |
| EP | 0 891 734 A1 | 1/1999 |

* cited by examiner

Primary Examiner—Reginald L. Alexander
(74) Attorney, Agent, or Firm—Maginot, Moore & Bowman

(57) ABSTRACT

The invention provides a coffee machine for brewing coffee powder pre-packed in a cartridge, whereby the bottom of the brewing chamber receiving the cartridge is provided with perforator members to perforate the cartridge bottom upon closing the brewing chamber. A brewing chamber housing contains an upper and a lower brewing chamber portion together delimiting the brewing chamber and axially movable relative to each other. The upper brewing chamber portion is biased by a spring to move away from the lower brewing chamber portion and provided with a protection member that bars access to the perforator members if the upper brewing chamber member is in its upper rest position. The upper brewing chamber member is moved, together with the protection member, from an upper into a lower operating position in which the perforator member provide the bottom of the cartridge with elongate slots.

11 Claims, 2 Drawing Sheets

COFFEE MACHINE FOR BREWING COFFEE POWDER PRE-PACKED IN A CARTRIDGE

BACKGROUND OF THE INVENTION

The present invention refers to a coffee machine for brewing coffee powder pre-packed in a cartridge, comprising perforator members for creating openings in the cartridge bottom.

PRIOR ART

In order to brew coffee powder pre-packed in a cartridge, up to now, mostly semi-automatic coffee machines are used in which the cartridge has to be inserted into a sieve holder with its cap facing downwards, whereby the sieve holder, thereafter, has to be manually fixed to the coffee machine. The coffee machine comprises a brewing pin member provided with radial outlet openings for the brewing water, located in the region of the portion pack holder fixing. The brewing pin member penetrates the bottom of the cartridge when the sieve holder is fixed to the coffee machine. The sieve holder itself is provided, at its bottom, with a plurality of projections. These projections penetrate the cap of the cartridge and perforate it, as soon as brewing water is fed to the sieve holder, whereby the cartridge is pressed against these projections under the influence of the hydraulic overpressure. At the consecutive brewing operation, the brewing water is fed into the cartridge by the brewing pin member, thus flowing through the coffee powder contained therein and escaping from the interior of the cartridge through the perforation in the cap. The freshly brewed coffee beverage can escape through outlets located at the lower side of the sieve holder.

In recent times, fully-automatic coffee machines are available in which a cartridge containing the pre-packed coffee powder is taken out of a magazine containing a plurality of cartridges and displaced to a brewing chamber of the coffee machine. At the bottom of this brewing chamber, perforator members are located which provide the bottom of the cartridge with slots upon closing the brewing chamber. Through these slots, brewing water can flow into the interior of the cartridge. For closing the brewing chamber, such a machine comprises a movable closure member provided with a plurality of projections located at its lower surface facing the brewing chamber. Once the brewing chamber is closed by means of this closure member, the brewing water is lead under pressure into the brewing chamber in the afore mentioned manner.

Thus a hydraulic overpressure is created in the interior of the brewing chamber containing the cartridge such that the cartridge is pressed against the lower surface of the closure member provided with the afore mentioned projections with the result that these projections penetrate and perforate the cover of the cartridge.

Usually, the brewing chamber of such fully automatic coffee machines is part of a user removable module that can be taken out easily, without any tools, by the operator for the reason of cleaning. Thereby, it should be ensured that the operator cannot be injured by the afore mentioned perforator members, mostly in the form of sharp knives located at the bottom of the brewing chamber, for example, if he puts a finger into the brewing chamber.

OBJECTS OF THE INVENTION

Thus, it is an object of the invention to provide a coffee machine for brewing coffee powder pre-packed in a cartridge in which such danger of injury is avoided or at least greatly reduced.

SUMMARY OF THE INVENTION

To meet this and other objects, the invention provides a coffee machine for brewing coffee powder pre-packed in a cartridge which comprises a brewing chamber adapted to contain the cartridge with perforator members protruding into the brewing chamber adapted to create at least one opening in the cartridge bottom of the cartridge. A protection member is movable relative to the perforators between a rest position and an operating position. The protection means is adapted, once being in its rest position, to bar access to the perforators.

By providing a protection member which is movable relative to the perforators between a rest position and an operating position that, if it is in its rest position, bars access to the perforators, the risk of injury of the operator of the machine is avoided to the farthest extent. Preferably, the protection member is moved from its rest position to its operating position by the afore mentioned closure member during closing the brewing chamber, whereby the cartridge bottom is provided with the slots under the effect of the perforator members when the protection member is in its operating position.

BRIEF DESCRIPTION OF THE DRAWINGS

In the following, an embodiment of the coffee machine according to the invention will be further described, with reference to the accompanying drawings, in which.

DETAILED DESCRIPTION OF A PREFERRED EMBODIMENT

Figure 1:
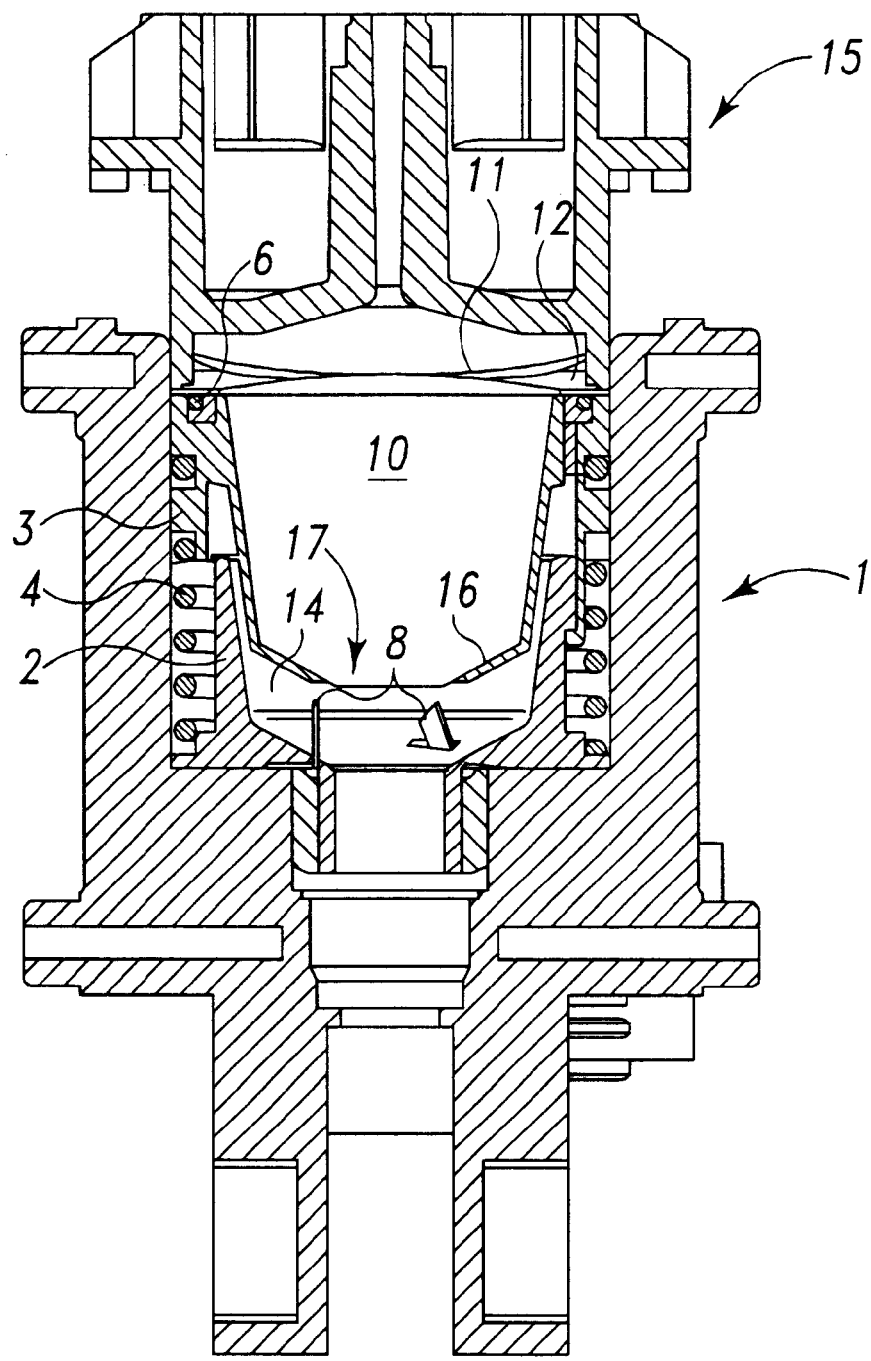
FIG. 1 shows a longitudinal cross-sectional view of a schematically illustrated brewing assembly, having inserted a pre-packed coffee cartridge to be brewed, in its initial state.

FIG. 1 shows a longitudinal cross-sectional view of a schematically illustrated brewing assembly of a preferably fully automatically operating coffee machine for brewing coffee powder pre-packed in a cartridge 10. Preferably, the brewing assembly is located, together with a brewing chamber closing means or closure piston 15, on a slide-in module that can be easily removed, without any tools, from the coffee machine to be cleaned and thereafter inserted therein again.

The brewing assembly comprises a brewing chamber housing 1 in which are located two brewing chamber portions 2 and 3 constituting the real brewing chamber 14. In the present example, an upper brewing chamber portion 3 is arranged vertically and concentrically above a lower brewing chamber portion 2. The upper chamber portion 3 is axially movable relative to the lower chamber portion 2, whereby the upper chamber portion 3 is biased by means of a spring member 4 forcing the upper chamber portion 3 into an upper rest position against a stop member, as shown in FIG. 1 of the attached drawings.

For closing the brewing chamber 14, first the brewing chamber housing 1 is swiveled and thereafter raised against the closure piston 15. The operating means required for swiveling the brewing chamber housing 1 are not shown either. The bottom of the brewing chamber 14 is provided with three perforator members 8 in the shape of inclined knife blades which are adapted to perforate the back side of the cartridge 10. However, it should be noted that only two of the three perforator members 8 are visible in the sectional view of FIG. 1. The upper brewing chamber portion 3 is provided with an extension member 16 whose shape essentially corresponds to the shape of the outside of the cartridge 10. The extension member 16 comprises a central opening 17 whose edge is provided with radially extending recesses 18.

Figure 2:
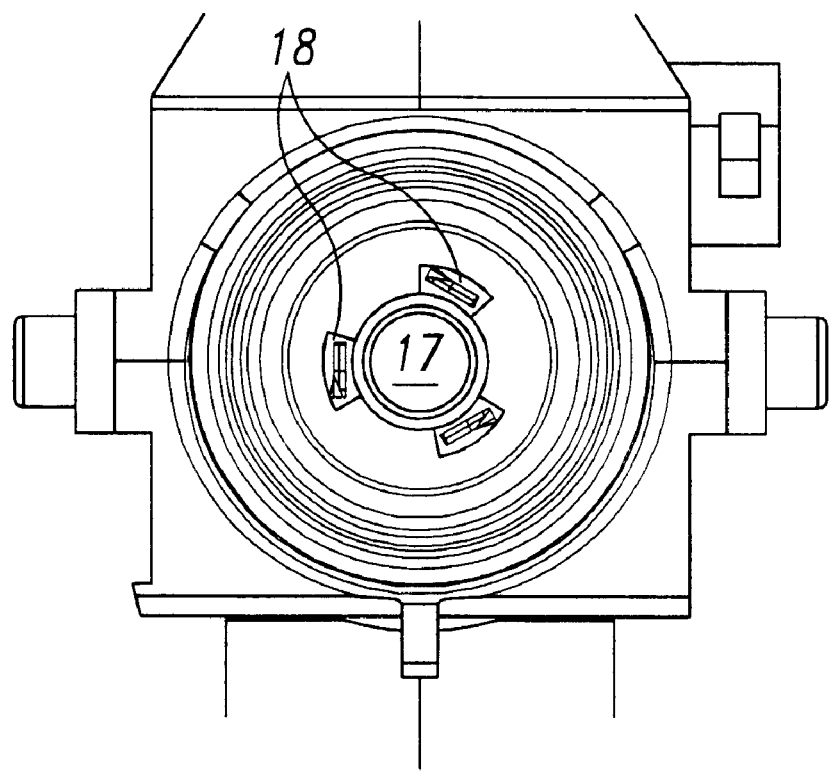
FIG. 2 shows a schematic top view of the brewing assembly of FIG. 1.

FIG. 2 shows a schematic top view of the brewing assembly of FIG. 1. In this view, particularly the three perforator members 8 as well as the central opening 17 and the recesses 18 are clearly visible.

The extension member 16 shall prevent that a person operating the coffee machine could be injured, particularly the fingers of that person, by the perforator members 8. The diameter of the central opening 17 as well as the length of the recesses are chosen such that a finger of an adult person, under normal circumstances, cannot be pushed neither axially into the opening 17 nor laterally through the recesses 18 to such an extent that the perforator members could injure the operating person. In the present example, the central opening 17 has a diameter of approximately 13 millimeters, and the recesses 18 have an mean length of approximately 5 millimeters.

Upon raising the brewing chamber housing 1, the closure piston 15 enters the interior of the brewing chamber housing 1 and abuts against the top of the upper brewing chamber portion 3 such that the latter one, together with the cartridge 10 and the extension member 16, is moved downwards against the biasing force of the spring member 4. Due to the relative movement of the cartridge 10 and the extension member 16 on the one side and the perforator members 8 on the other side, the perforator members 8 penetrate the bottom of the cartridge 10 and create slots in the bottom of the cartridge. Thereby, due to the inclined arrangement of the knife-shaped perforator members 8, the bottom of the cartridge 10 will be provided with longitudinal slots S which are longer than the width of the corresponding perforator member 8.

In the upper end position of the brewing chamber housing 1, the lower side of the upper brewing chamber portion 3 abuts against the upper side of the lower brewing chamber portion 2 and the closure piston side 15 presses the cartridge 10 downwards such that its edge 12 rests against a sealing member 6 provided on the upper brewing chamber portion 3; thereby, the front portion of the cartridge 10 is hydraulically sealed vis-a-vis the back portion of the cartridge 10.

Once the bottom of the cartridge 10 has been perforated and the front portion of the cartridge 10 has been hydraulically sealed vis-à-vis the back portion of the cartridge 10, brewing water can be lead into the brewing chamber 14. The brewing water can flow through the opening 17 and the recesses 18 to the back side of the cartridge 10 with the result that the cartridge 10 is hydraulically pressed upwards against the closure member. Thereby, protrusions provided on the closure member (not shown) are pressed against the cover 11 of the cartridge 10 and perforate the cover 11. Now, the brewing water can flow through the slots S created by the perforator members 8 into the interior of the cartridge 10. Due to the fact that the brewing water flows from the outside of the cartridge 10 to its inside, and further due to the fact that only narrow slots are created in the bottom of the cartridge, it can be ensured that no coffee powder is flushed out of the cartridge 10 during the real brewing operation with the result that the coffee machine is much less contaminated. Finally, the brewed coffee beverage can escape from the interior of the cartridge 10 through the openings in the cover 11 of the cartridge 10 and flow through not shown conduits to a coffee beverage outlet.

After the coffee brewing operation, the brewing chamber housing 1 is lowered again and swiveled back to its initial position. Now, the cartridge 10 containing the used coffee powder is ejected from the brewing chamber housing 1 by not further shown suitable means, for example by inserting a pushrod through the opening 17 into the brewing chamber 14 and moving the cartridge 10 upwards to such an extent that the cartridge 10 is removed from the brewing chamber 14, either under the influence of gravity if the brewing chamber is in an oblique position, or by a power driven means. It is understood that the opening 17 is required only in the case if such a power driven means is required for removing the cartridge that comprises a member adapted to move into the brewing chamber 14. If no such ejecting means is provided, one can abstain from providing the opening 17.

What is claimed is:

1. Coffee machine for brewing coffee powder pre-packed in a cartridge means having a cartridge bottom, comprising:
    a brewing chamber means adapted to contain said cartridge means;
    a perforator means protruding into said brewing chamber means and adapted to create at least one opening in said cartridge bottom of said cartridge means; and
    a protection means movable relative to said perforator means between a rest position and an operating position, said protection means being adapted, once being in its rest position, to bar access to said perforator means.

2. Coffee machine according to claim 1 in which said protection means is moved from its rest position to its operating position by a brewing chamber closing means upon closing said brewing chamber.

3. Coffee machine according to claim 1, further comprising a brewing chamber housing means adapted to receive a first upper brewing chamber portion and a second lower brewing chamber portion, said first and second brewing chamber portions defining said brewing chamber means, and said first and second brewing chamber portions being axially movable relative to each other.

4. Coffee machine according to claim 3, further comprising spring means adapted to bias said first upper brewing chamber means such that it is in a rest position distantly from said second lower brewing chamber means, whereby said protection means is in the shape of an extension means integrally formed on said first upper brewing chamber means.

5. Coffee machine according to claim 3 in which said first upper brewing chamber means comprises supporting means for supporting said cartridge means in vertical direction.

6. Coffee machine according to claim 2 in which said brewing chamber closing means is adapted to move said first upper brewing chamber means together with the cartridge means contained therein and vertically supported by said supporting means towards said second lower brewing chamber means to such an extent that said brewing chamber means is closed and said perforator means perforate said cartridge bottom.

7. Coffee machine according to claim 1 in which said perforator means comprises a plurality of perforator member means arranged along a circle, whereby said protection means comprises a central opening means as well as a plurality of lateral recess means whose number and position correspond with said plurality of said perforator member means.

8. Coffee machine according to claim 7 in which said perforator member means comprise oblique perforator knife means adapted to create perforations in said bottom of said cartridge means whose length is greater than the mean width of said perforator knife means.

9. Coffee machine according to claim 3 in which said first upper brewing chamber portion and said second lower brewing chamber portion, when moved towards each other and delimiting said brewing chamber means, have an inner shape essentially corresponding to the outer shape of said cartridge means.

10. Coffee machine according to claim 3 in which said brewing chamber closing means is adapted to move said first upper brewing chamber means together with the cartridge means contained therein and vertically supported by said supporting means towards said second lower brewing chamber means to such an extent that said brewing chamber means is closed and said perforator means perforate said cartridge bottom.

11. Coffee machine according to claim 5 in which said brewing chamber closing means is adapted to move said first upper brewing chamber means together with the cartridge means contained therein and vertically supported by said supporting means towards said second lower brewing chamber means to such an extent that said brewing chamber means is closed and said perforator means perforate said cartridge bottom.

* * * * *